C. FRINGS.
LUG MECHANISM.
APPLICATION FILED APR. 16, 1920.

1,372,346.

Patented Mar. 22, 1921.
3 SHEETS—SHEET 1.

INVENTOR.
CASPER FRINGS
BY A. E. Carlsen.
ATTORNEY

C. FRINGS.
LUG MECHANISM.
APPLICATION FILED APR. 16, 1920.
1,372,346.
Patented Mar. 22, 1921.
3 SHEETS—SHEET 2.
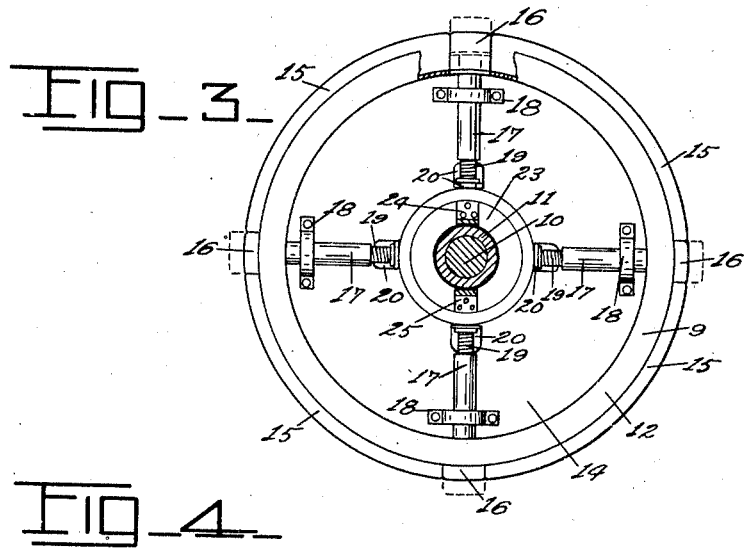
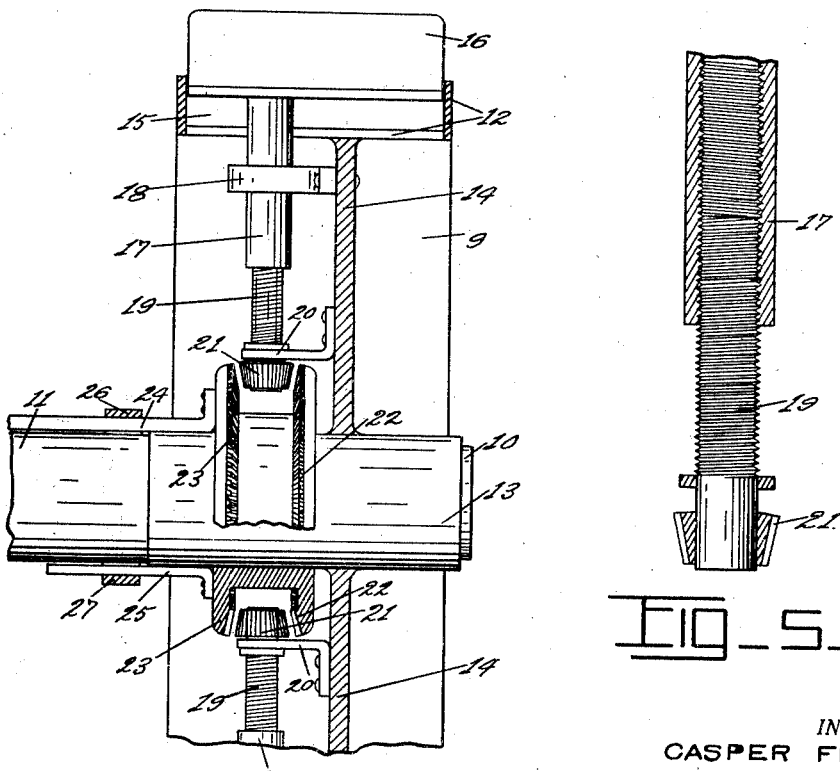
INVENTOR.
CASPER FRINGS
BY A. E. Carlsen.
ATTORNEY C. FRINGS.
LUG MECHANISM.
APPLICATION FILED APR. 16, 1920.
1,372,346.
Patented Mar. 22, 1921.
3 SHEETS—SHEET 3.
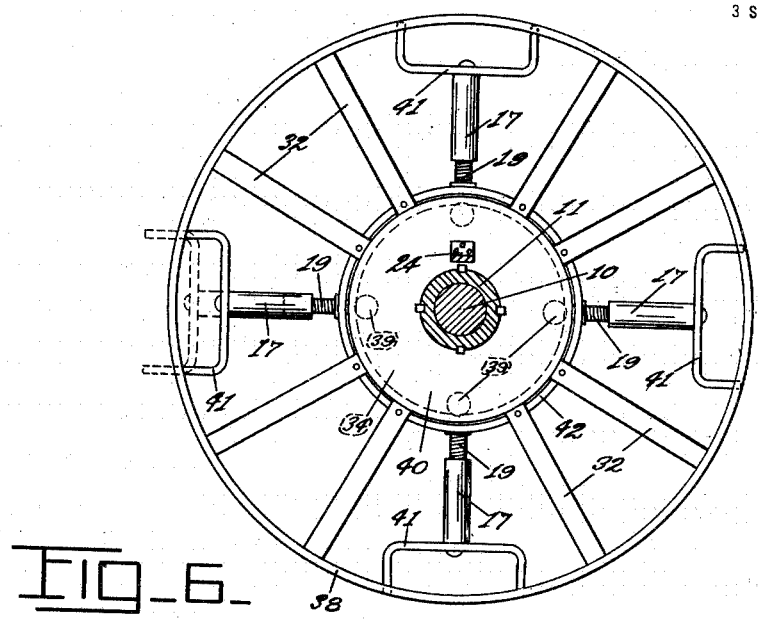
FIG_6_
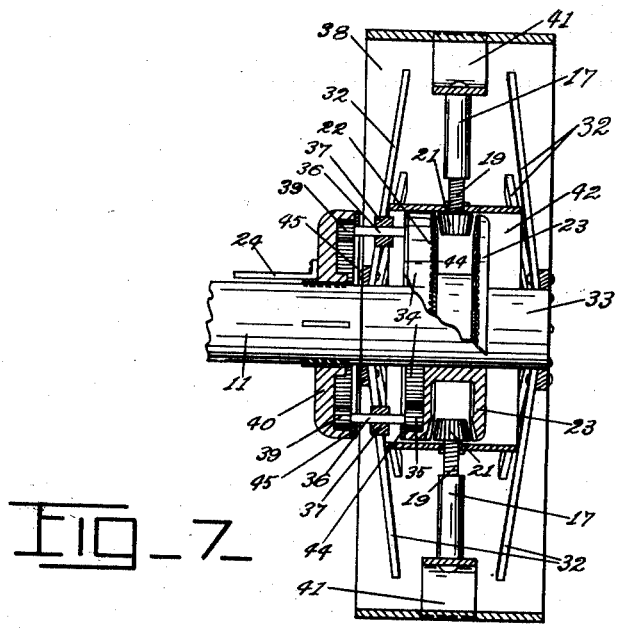
FIG_7_
INVENTOR.
CASPER FRINGS
BY *A. E. Carlsen*
ATTORNEY

UNITED STATES PATENT OFFICE.

CASPER FRINGS, OF RICHMOND, MINNESOTA.

LUG MECHANISM.

1,372,346. Specification of Letters Patent. Patented Mar. 22, 1921.

Application filed April 16, 1920. Serial No. 374,483.

*To all whom it may concern:*

Be it known that I, CASPER FRINGS, a citizen of the United States, residing at Richmond, in the county of Ray and State of Minnesota, have invented certain new and useful Improvements in Lug Mechanism, of which the following is a specification.

This invention relates to improvements in truck and tractor wheels and the object is to provide lugs therein adapted to be extended for use and drawn out of use by the operation of a lever near the seat of the vehicle. The invention is clearly illustrated in the accompanying drawings, in which:

Fig. 3 is an enlarged sectional view on the line 3—3 in Fig. 2.

Fig. 4 is an enlarged vertical sectional view of the upper part of one of the wheels.

Fig. 5 is an enlarged substantially diametrical view of one of the lug actuating arms.

Fig. 6 is an inner side view of a tractor wheel embodying a modification of the invention.

Fig. 7 is a substantially vertical diametrical view of the wheel as seen in Fig. 6.

Figure 1:
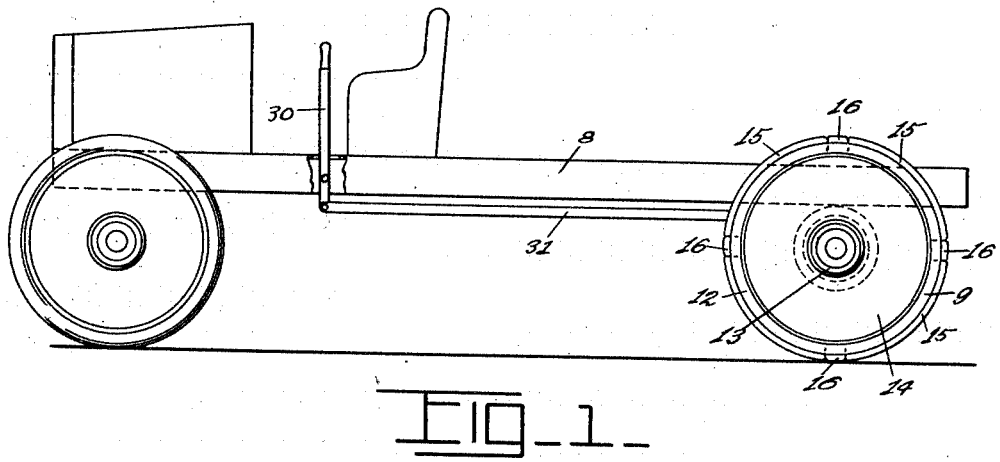
Figure 1 is a side elevation of a vehicle equipped with my invention, a portion being broken away.

Referring to the drawings by reference numerals, 8 designates the body of a vehicle having rear wheels 9 driven by an axle 10 in a housing 11.

Figure 2:
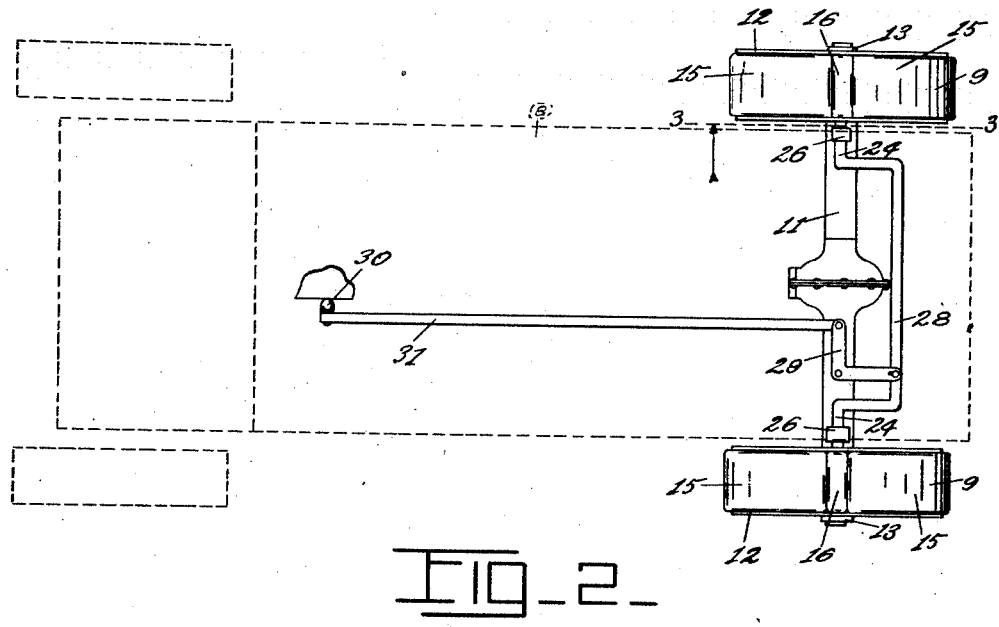
Fig. 2 is a top view of the operating mechanism the vehicle being shown in dotted lines.

With reference to the construction illustrated in Figs. 1, 2, 3, 4 and 5: The wheel in this form of the type in which the rim 12 is connected to the hub 13 by a solid steel web 14. Solid tire sections 15 are secured in the rim and have intermediate their ends short lug sections 16 which are adapted to move in and out radially. Each of said lug sections 16 is secured upon the end of a radially positioned internally threaded member 17 which is slidably mounted in a bracket 18 secured to said web 14. A bar 19 is threaded to screw into said member 17 and is rotatably secured at its inner end by a bracket 20. A pinion 21 is fixed to each of said bars and is adapted to mesh alternatively with either of two integral gears 22 or 23 or to remain in idle position between them. The gear member 22, 23 is slidably mounted on the hub 13 which rotates within it, but it is prevented from turning by two members 24 and 25 which are slidably secured in brackets 26 and 27 respectively on the housing 11. The members 24 on each side of the vehicle are connected by a connecting rod 28 which is actuated by a bell crank lever 29, which in turn is operatively connected to a hand lever 30 by a link rod 31. Thus when the lever is in vertical position, as shown, and when the wheels 9 are rotating the pinions 21 are idle, but when it is thrown either forward or backward one of the gears 22 or 23 are thrown in mesh with the pinions 21 which travel thereon and in so doing rotate the bars 19 and in so doing actuate the lug bearing members 17 inward or outward to the extent desired. As the gear members 22, 23 are actuated simultaneously by the connecting rod 28 the pinions of the respective wheels will be actuated both from one side and the same movements will thus be imparted to all the lugs.

In the modification shown in Figs. 6 and 7 is illustrated the most practical method of applying the invention to tractor wheels where the spokes 32 radiate from both ends of the hub 33. In this case the gear member 22, 23 is provided with an internally toothed flange 34 in which is mounted to mesh and travel pinions 35 which are fixed on stub shafts 36 rotatably mounted in bearings 37 in the tractor wheels 38. The other ends of said shafts 36 are provided with pinions 39 which mesh with and travel against an internal gear 40. Said gear 40 is slidably keyed on the housing 11 and is actuated back and forth by a rod 24 as above described in the first mentioned structure. In a tractor wheel, however, where it is customary to use a heavy flat steel tire, as shown, the lugs are also subject to more practical modification. In this case the members 17 are provided with double or U-shaped lugs 41 which are slidably mounted in transverse slots in the tire. Instead of brackets 20 as formerly described the bars 19 may be more conveniently journaled in a circular bearing plate 42 secured to the inner sides of the spokes 32.

In the modified structure as thus described, when the pinions 21 are idle, the elements 35, 36, 37 and 39 revolve with the wheel 38 but as the gear 40 cannot revolve the action of the pinions 35 and 39 keeps the gears 22 and 23 from revolving. And thus when either of such gears is moved to engage the pinions 21 they will of course turn in traveling thereon. The pinions 35 and 39 are prevented from being pulled out of the internal gears 34 and 40 by rims 44 and 45 which are secured to the gears 34 and 40 and act against the outer sides of said pinions.

If a truck, tractor or other vehicle is thus equipped with my invention, when deep mud or snow or ice is encountered it is only necessary to actuate the hand lever in the proper direction and with the wheels revolving the lugs 16 or 41 will gradually be pushed out until the vehicle will get a footing and keep on traveling. To retract the lugs it is only necessary to reverse the lever until this is accomplished when it is thrown into neutral position.

Having now therefore fully shown and described my invention, what I claim to be new and desire to protect by Letters Patent is:

1. In combination with a drive wheel having a hub rotatably mounted on a vehicle, of lug supporting members adapted to be adjusted radially in said wheel, bars rotatably mounted in said wheel and threaded into said members, fixed pinions on the inner ends of said bars, gears slidably mounted on said hub and adapted to engage alternatively with said pinions, hand operated means for sliding said gears back and forth.

2. In combination with a drive wheel having a hub rotatably mounted on a vehicle, of lug supporting members adapted to be adjusted radially in said wheel, bars rotatably mounted in said wheel and threaded into said members, fixed pinions on the inner ends of said bars, gears slidably mounted on said hub and adapted to engage alternatively with said pinions, hand operated means for sliding said gears back and forth, means for preventing said gears from turning with said hub.

3. In combination with a drive wheel having a hub rotatably mounted adjacent an axle housing, of lug supporting members adapted to be adjusted radially in said wheel, bars rotatably mounted in said wheel and threaded into said members, pinions on the inner ends of said bars, a gear member slidably and rotatably mounted on said hub and having inwardly faced toothed portions adapted to engage alternatively with said pinions, a second gear member slidably keyed on said axle housing, operative connection between said gear members.

4. In combination with a drive wheel having a hub rotatably mounted adjacent an axle housing, of lug supporting members adapted to be adjusted radially in said wheel, bars rotatably mounted in said wheel and threaded into said members, pinions on the inner ends of said bars, a gear member slidably and rotatably mounted on said hub and having inwardly faced toothed portions adapted to engage alternatively with said pinions, a second gear member slidably keyed on said axle housing, operative connection between said gear members, hand operated means for simultaneously shifting the positions of said gear members.

In testimony whereof I affix my signature.

CASPER FRINGS.